US009737052B2

(12) United States Patent
Larson

(10) Patent No.: US 9,737,052 B2
(45) Date of Patent: Aug. 22, 2017

(54) DIGESTIBLE NOISE-EMITTING TOY

(71) Applicant: Petco Animal Supplies Stores, Inc., San Diego, CA (US)

(72) Inventor: Lisa Marie Matwijiw Larson, San Marcos, CA (US)

(73) Assignee: Petco Animal Supplies Stores, Inc., San Diego, CA (US)

( * ) Notice: Subject to any disclaimer, the term of this patent is extended or adjusted under 35 U.S.C. 154(b) by 0 days.

(21) Appl. No.: 14/554,781

(22) Filed: Nov. 26, 2014

(65) Prior Publication Data

US 2016/0143251 A1    May 26, 2016

(51) Int. Cl.
| | |
|---|---|
| *A01K 15/00* | (2006.01) |
| *A01K 29/00* | (2006.01) |
| *A01K 15/02* | (2006.01) |
| *A23K 1/18* | (2006.01) |

(52) U.S. Cl.
CPC .......... *A01K 15/026* (2013.01); *A01K 15/025* (2013.01); *A23K 1/1846* (2013.01)

(58) Field of Classification Search
CPC ..... A01K 15/02; A01K 15/025; A01K 15/026
USPC .................. 119/702, 707, 709–711
See application file for complete search history.

(56) References Cited

U.S. PATENT DOCUMENTS

| | | | |
|---|---|---|---|
| 1,630,260 A | 5/1927 | Evans | |
| 3,107,651 A * | 10/1963 | Beck | 119/709 |
| 3,977,292 A | 8/1976 | Favilli et al. | |
| 5,240,720 A * | 8/1993 | Axelrod | 426/2 |
| 5,419,283 A * | 5/1995 | Leo | 119/709 |
| 5,560,320 A * | 10/1996 | Plunk | 119/709 |
| 6,455,083 B1 | 9/2002 | Wang | |
| 6,725,809 B1 * | 4/2004 | Olgin | 119/710 |
| 6,892,674 B1 | 5/2005 | Dubinins et al. | |
| 7,144,293 B2 | 12/2006 | Mann et al. | |
| 7,677,203 B2 * | 3/2010 | Stern | 119/709 |
| 8,235,762 B2 * | 8/2012 | Rutherford et al. | 446/184 |
| 8,468,977 B2 * | 6/2013 | Markham | 119/709 |
| 2004/0134434 A1 | 7/2004 | Kraft et al. | |
| 2008/0141948 A1 * | 6/2008 | Renforth et al. | 119/710 |
| 2009/0205579 A1 | 8/2009 | Hirschberg | |
| 2012/0048251 A1 | 3/2012 | Oblack et al. | |
| 2012/0090554 A1 | 4/2012 | Nunn et al. | |

(Continued)

FOREIGN PATENT DOCUMENTS

EP    1241946 B1    12/2006

OTHER PUBLICATIONS

PCT Application No. PCT/US2015/061164; International Search Report and Written Opinion dated Feb. 1, 2016; 9 pages.

*Primary Examiner* — David Parsley
(74) *Attorney, Agent, or Firm* — Kilpatrick Townsend & Stockton, LLP

(57) ABSTRACT

A physical toy comprising a body and a digestible noise-emitting device. The body may have a shape conducive to physical manipulation and play and may be compliant to facilitate compression. The noise-emitting device may be carried by the body. The noise-emitting device may have a noise-emitting orifice. The noise-emitting device may be configured to force air through the noise-emitting orifice in response to compression of the body. Compression of the physical toy body may cause noise generation as air escapes through the noise-emitting orifice. The noise-emitting device may be formed from a digestible material.

20 Claims, 5 Drawing Sheets

(56) References Cited

U.S. PATENT DOCUMENTS

2012/0145090 A1* 6/2012 Kolozsvari et al. .......... 119/710
2012/0272922 A1   11/2012 Axelrod et al.
2016/0066540 A1   3/2016 Forsythe et al.

* cited by examiner

DIGESTIBLE NOISE-EMITTING TOY

FIELD OF THE DISCLOSURE

The disclosure relates to a physical toy that includes a body and a digestible noise-maker. Various configurations of the digestible noise-maker, their types, and configurations contained within the body of the physical toy are also disclosed.

BACKGROUND

Typical noise-making physical toys may contain a compressible bladder that emits noise when compressed. The noise-making bladder may present a hazard to a child or animal using the toy. In particular, dogs have a natural tendency to find the bladder and eat it. Similar issues may arise with small children or toddlers.

SUMMARY

One aspect of the disclosure relates to a physical toy that contains a digestible noise-maker. The physical toy may be configured to allow compression of the body and/or the noise-maker. The noise-maker may be configured such that compression causes the device to generate audible sounds. The noise-maker may be configured such that another external force such as gravity causes the device to emit or generate noise. The inclusion of a digestible noise-maker may enhance satisfaction for dogs and/or other animals that access the digestible noise-maker within the toy. The noise-maker may be digested rapidly in the mouth or esophagus.

The physical toy may include a body, a noise-maker, and/or other components. The body and noise-maker may be shaped or constructed to enable physical manipulation of the physical toy. The toy body may be conducive to compression during play. The body may represent a small animal or object (e.g. a stuffed animal toy). The body may be formed from a variety of materials. For example, the body may be formed with open-cell foam, a stuffed toy, and/or other materials.

The body may contain a noise-maker. Compression of air may force air through the noise-maker. The compressed air may cause the generation of a noise as forced air escapes through the noise-emitting orifice and/or noise-emitting device. One or more components of the noise-maker may be formed from a digestible material.

The noise-maker may include multiple noise-emitting orifices and/or noise-emitting devices. One or more components of the noise-maker may be digestible. The noise-emitting device may be configured to fit within an orifice through which compressed air escapes. A noise-emitting orifice may be configured to emit noise without a noise-emitting device. As used herein, an opening through which compressed air may pass without generating audible noise is referred to as an orifice, whereas an opening configured to generate audible noise when compressed air passes through the orifice is referred to as a noise-emitting orifice. An orifice may be configured with a noise-emitting device to generate noise. A noise-emitting orifice or an orifice with a noise-emitting device may be implemented and/or combined to enhance the sound quality emitted from the toy. A noise-emitting orifice may be designed to emit noise in the presence of a noise-emitting device within the orifice. An orifice may be configured to force compressed air through a noise-emitting device to generate sound. In this configuration, the noise-emitting device may be required in order to produce audible sounds. The noise-maker may have a compressible bladder that fills with air and then forces air through the noise-emitting orifice when compressed. The noise-maker or its components may be digestible. Components of the noise-maker that may be digestible include the bladder, the noise-emitting device, and/or other components of the noise-maker.

The physical toy body may be digestible. Such a configuration may enable the user of the physical toy to consume and digest the complete physical toy. The physical toy body may not be digestible. In such configurations, the body may not be digestible but the noise-maker, the noise-emitting device, the compressible bladder, and/or other components of the physical toy may be digestible.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
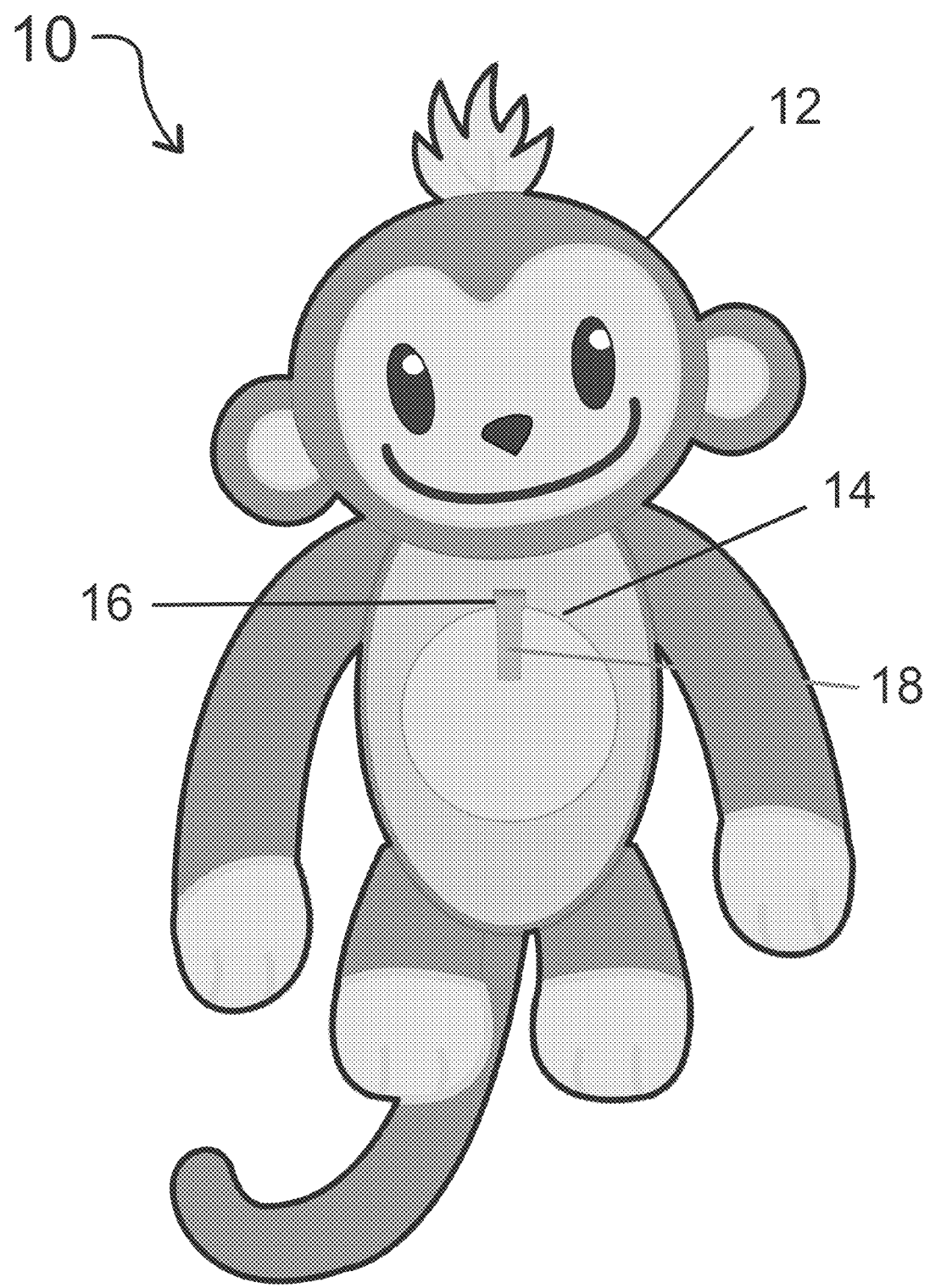
FIG. 1 is a schematic illustration of a toy with digestible noise-maker, in accordance with one or more implementations.

FIG. 1 illustrates a schematic illustration of a physical toy 10 capable of emitting a noise. The toy 10 may include one or more of a body 12, a noise maker 14, and/or other components. Body 12 and/or noise-maker 14 may form an orifice 18. Orifice 18 may be a noise-emitting orifice or an orifice configured to contain noise-emitting device 16. Animals and/or children may have an instinctual tendency to consume the noise-maker 14. The child or animal may not have an instinctual tendency to consume toy body 12. Thus, in some configurations, there may be little need for the toy body 12 or the components of body 12 to be digestible, while the digestibility of one or more components of the noise-maker 14 may be consequential.

Body 12 may have a shape conducive to physical manipulation. Toy 10 may be conducive to physical manipulation or play such that body 12 may be compliant to facilitate compression. Body 12 may or may not be digestible. Body 12 may represent a small animal and/or other objects. For example, the body may be a representation of an animal, e.g. bear, dog, monkey, and/or other representations of an animal. The body may be a representation of a familiar object. For example, a stuffed toy bone for a dog toy. The body may be a seasonal representation, such as a bunny in spring, a decorated tree or menorah in December, and/or other seasonable representations.

Body 12 may be stuffed, molded, printed (e.g. with a 3D printer), and/or formed using other construction techniques. Body 12 may be water, impact, and/or otherwise resistant. Body 12 may be made or constructed of plastic, fiber, cotton, synthetic material, food, open cell-foam, and/or other materials. Body 12 is contemplated to be constructed from a wide variety of materials and may include a wide variety of forms and configurations.

Body 12 of a stuffed toy may include a cover, a stuffing material, noise-maker 14, and/or other components. The cover may include many shapes, forms, and materials. The cover may be made of synthetic material, cotton, felt, "faux fur," toweling, velvet, polyester, polyethylene, nylons, polyurethanes, and/or other materials. The cover may be designed to be resistant to water, for example, a retrieving toy that is designed to be thrown into a lake or bathtub. The cover may be impact resistant, for example a toy that is designed to be bounced or thrown against a floor or wall.

The stuffing material may include a wide assortment of materials (e.g. edible or non-edible). A material may be selected that is edible but not intended to be consumed including: garbanzo beans, kidney beans, other beans, sawdust, rice, recycled paper/cardboard/plastics, manmade fibers, natural fibers, and/or other materials. The stuffing material may include fabric, feathers, body 12, and/or other materials.

Body 12 may be made with open-cell foam which contains a noise-maker 14. The shapes of the open-cell foam toy may include an animal or object, as discussed previously for the cover of the stuffed toy. The open-cell foam configuration may include a cover or may be configured without an exterior cover.

The body 12 may not be included with the noise-maker 14. For example, a consumer may purchase noise-maker 14 and configure the noise-maker 14 for use with a toy previously purchased (e.g. a preferred toy by a pet or child).

Body 12 of the physical toy may be digestible. Such a configuration may enable the user of the physical toy to consume and digest the complete toy. Toy body 12 may not be digestible. In such configurations, body 12 may not be digestible but the noise-maker 14 may be digestible.

The noise-maker 14 may be carried within body 12 and may include a noise-emitting device 16, a bladder, and/or other components. One or more of the components may be digestible. Noise-maker 14 may contain a reservoir or bladder filled with air. Compression of body 12 causes compression of the reservoir and/or the bladder of air. The compressed air within the reservoir and/or bladder may be forced through the formed orifice 18 and/or a noise-emitting device 16 (e.g. a honker). The formed orifice 18 and/or noise emitting device 16 may use the compressed air to generate noise. Noise-emitting device 16 may include a honker and/or other components. Noise-maker 14 and/or noise-emitting device 16 may be formed from a digestible material.

The noise-emitting device and the bladder may be two separate pieces. The noise-emitting device and the bladder may be formed integrally. The bladder may be contained within body 12. For example, a hollow body 12 may form an orifice 18 which includes a noise-emitting device 16. Hollow body 12 may form a noise-emitting orifice 18. Orifice 18 may be formed within body 12 and/or within noise-maker 14 contained within body 12.

One or more noise-makers 14 may include multiple orifices 18 and/or noise-emitting devices 16. The noise-maker(s) 14 and/or the noise-emitting device(s) 16 may be formed from digestible material. Such that, the noise-maker 14 may be configured within different types and/or configurations of physical toy body 12 (e.g., stuffed, formed from an open-cell foam, food, plastic, etc.).

Noise-maker 14 may be carried within the internal cavity formed by body 12. The noise-maker 14 may have a bladder that fills with air, and then forces air through one or more of the noise-emitting device(s) 16 and/or the noise-emitting orifice(s) 18 when compressed. The noise-maker may be a ribbed or tubular structure wherein a weight or ball is used to compress air through the weights gravitational pull. When the weight is placed within the noise-maker tubular device and the tube is overturned, the air may be compressed within noise-maker 14 and forced through the noise-emitting device 16 and/or the noise-emitting orifice 18, producing an audible sound. In this example, the tube, weight, ball, and/or other components of noise-maker 14 may be constructed with digestible material(s).

Figure 2:
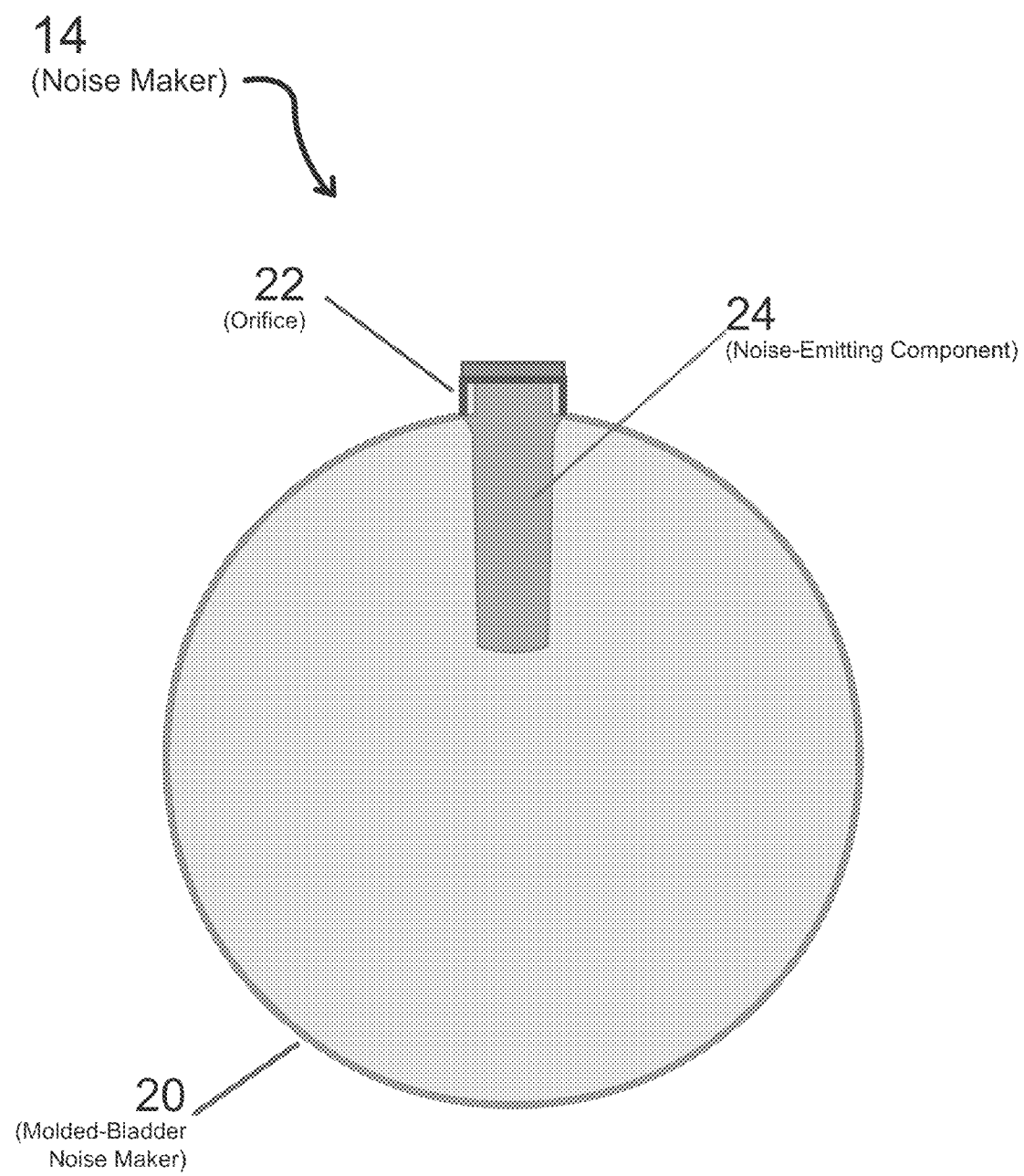
FIG. 2 illustrates a compressible bladder noise-maker, in accordance with one or more implementations.

A detailed view of one implementation of the digestible noise-maker 14 is illustrated in FIG. 2. Noise-maker 14 may include a compressible bladder 20, an orifice 22, a noise-emitting device 24, and/or other components. The compressible bladder 20 may include a noise-emitting device 24 and/or a noise-emitting orifice 22. The compressible bladder 20 design may include a volume of air within the compressible bladder 20. When the compressible bladder 20 noise-maker 14 is compressed, air may be forced through either noise-emitting orifice 22 and/or noise-emitting device 24 within orifice 22. The air forced through the noise-emitting orifice 22 and/or the noise-emitting device 24 may cause vibrational energy that generates audible noise or sound. The compressible bladder 20 may be a molded bladder. One or more components of the compressible bladder 20 noise-maker 14 including, compressible bladder 20, noise-emitting device 24, and/or other components of the compressible bladder 20 noise-maker 14 may be digestible.

Figure 3:
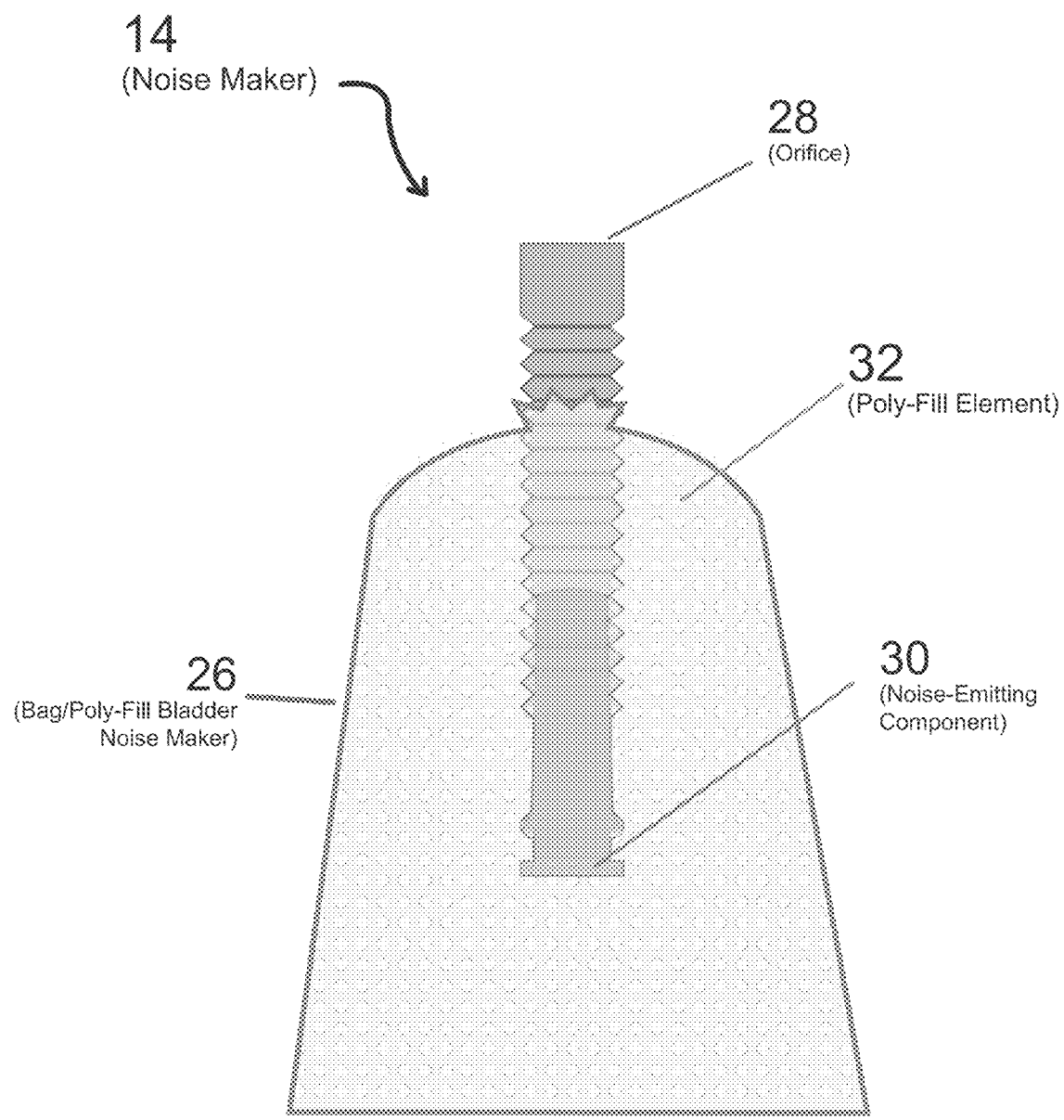
FIG. 3 illustrates a bag/poly-fill bladder noise-maker, in accordance with one or more implementations.

FIG. 3 presents a detailed illustration of one implementation of noise-maker 14 which may include a bag/poly-fill bladder 26. The bag/poly-fill bladder 26 noise-maker 14 may include an orifice 28, a noise-emitting device 30, poly-element(s) 32, and/or other components used to generate audible sounds. The bag/poly-filled bladder 26 may contain poly-elements 32 which may be noise generating. Bag 26 may provide a similar function as the compressible molded bladder 20 noise-maker 14 as illustrated in FIG. 2. Bag 26 may contain air that when compressed may be forced through orifice 28 and/or noise-emitting device 30. Orifice 28 may be a noise-emitting orifice 28. One or more of the bag 26, the poly-elements 32, the noise-emitting device 30, and/or other components of the bag/poly-fill bladder 26 noise-maker 14 may be digestible.

Figure 4:
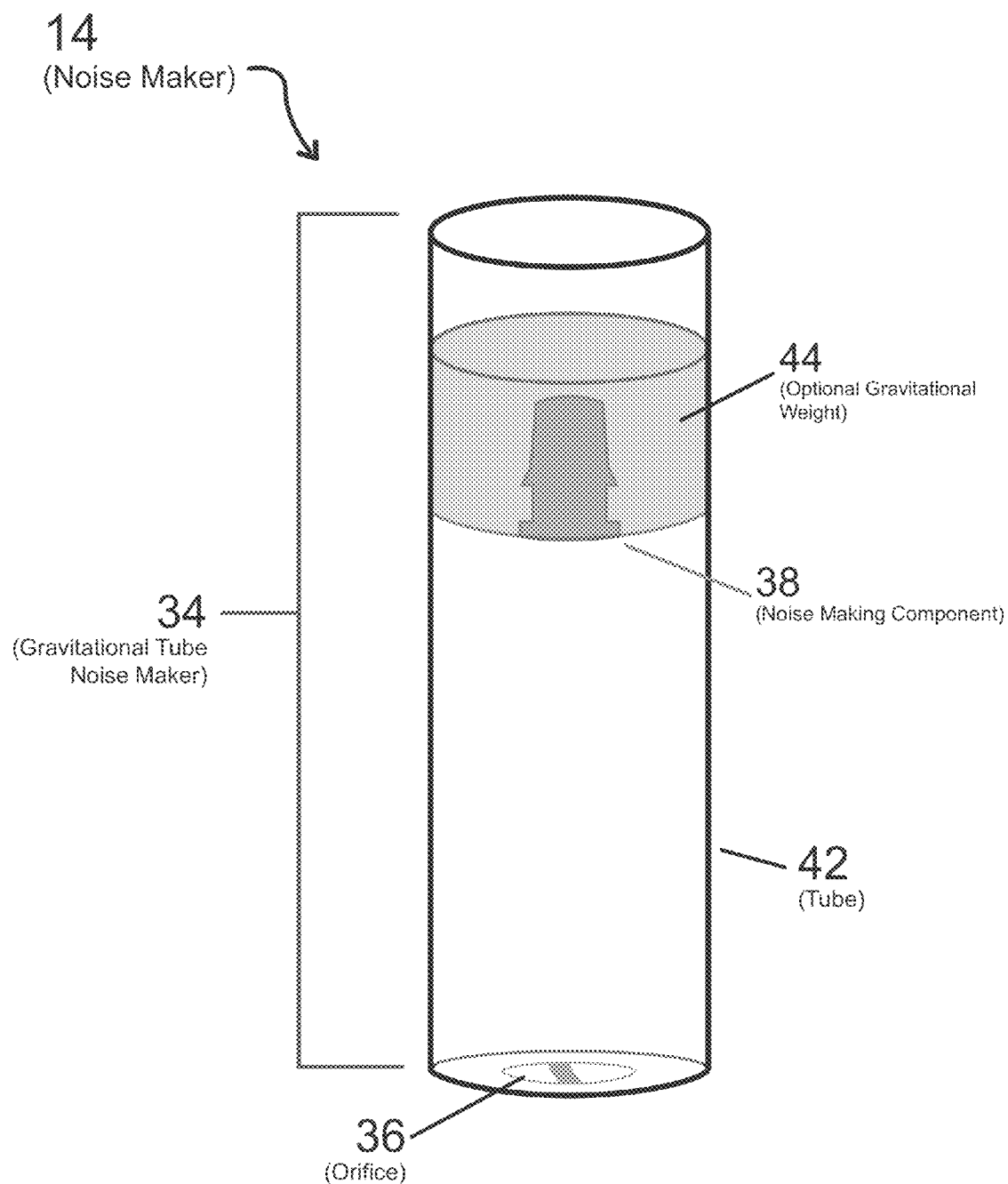
FIG. 4 illustrates a ribbed/tube noise-maker, in accordance with one or more implementations.

Referring to FIG. 4, illustrating a ribbed/tube 34 as another detailed illustration of one implementation of noise-maker 14. The ribbed/tube 34 noise-maker 14 may contain an orifice 36, a noise-emitting device 38, one or more ribs 40, a tube 42, an optional gravitational weight 44, and/or other components. The rib(s) 40 may change the pitch and/or volume of noise-maker 14. The rib(s) 40 may be used to lower the pitch and alter the consistency of the emitted noise. For example, different sized ribs 40 may be used to vary the consistency of the sound emitted by noise-maker 14. Rib(s) 40 may also create more varied and softer sounds and/or produce sound with a rhythmic quality. Tube 42 may be used to increase the pitch and volume of the noise generated. Some implementations may combine both rib(s) 40 and tube 42 in the same ribbed/tube 34 noise-maker 14. The ribbed/tube 34 noise maker 14 may operate by compression of the ribbed/tube 34 noise-maker 14. The ribbed/tube 34 noise-maker 14 may operate with an optional gravitational weight 44 enclosed within the ribbed/tube 34 noise-maker 14. When the noise-maker 14 is compressed and/or gravitational weight 44 is overturned and positioned to fall, trapped air within the ribbed/tube 34 may be compressed. The compressed air may then escape through noise-emitting orifice 36 and/or noise-emitting device 38 to generate a variety of audible sounds.

The ribbed/tube 34 noise-maker 14 may be conducive to physical compression and/or enclose a weight so that either or both methods may be used to compress the air trapped within the noise-maker 14. Noise emitting orifice 36 and/or a noise-emitting device 38 may be placed on opposite ends of noise-maker 14. In this configuration, each time the noise-maker 14 is overturned, the weight compresses trapped air and noise-maker 14 generates sound. One or more of the ribbed/tube 34 noise-maker 14, rib 40, tube 42, optional gravitational weight 44, and/or other components of the ribbed/tube 34 noise-maker 14 may be digestible.

Referring back to FIG. 1, the noise-maker 14 may be digestible with amylase and other natural enzymes within the mouth or esophagus according to one or more implementations. In this configuration, noise-maker 14 may be swallowed or partially swallowed without delaying digestion of noise-maker 14. This configuration may enhance the speed of digestion of noise-maker 14 which may begin in the mouth or esophagus. This implementation may enhance rapid digestion in order to reduce choking hazards to the user of the physical toy. Digestion in the mouth and/or esophagus may be partial such that selected structural components of the noise-maker and/or noise-emitting device are broken down more quickly. The ability to clear an obstruction in the throat of the user may be enhanced through the partial digestion of the structural components of the noise-maker 14.

Figure 5:
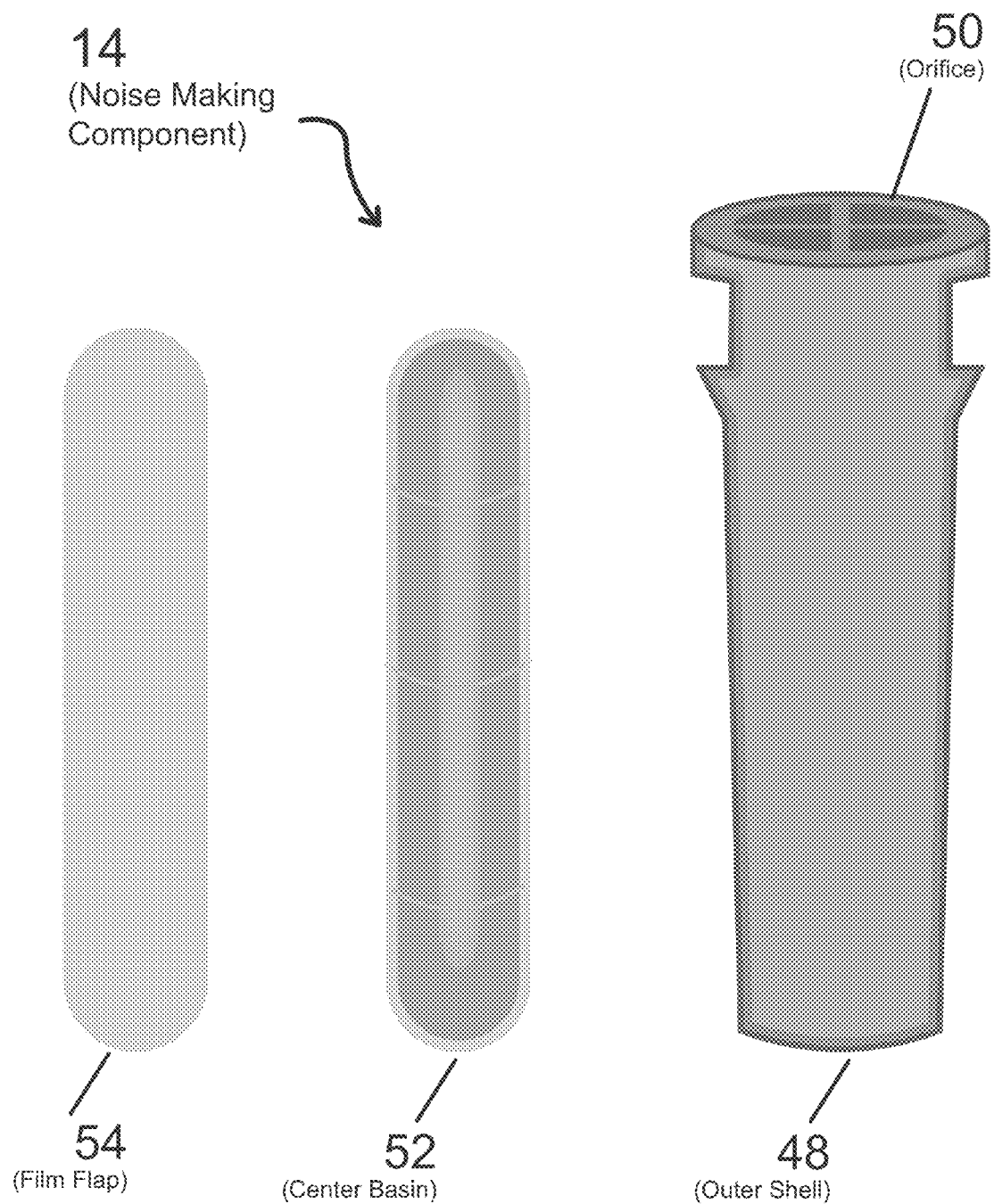
FIG. 5 is a detailed view of one implementation of a noise-emitting device. The noise-emitting device may be configured to vibrate a film flap to emit noise as air passes through the noise-emitting device, in accordance with one or more implementations.

FIG. 5 illustrates a detail view of a noise-making component as one implementation of a noise-emitting device 16. Noise-making component 46 may be used as a noise-emitting device 16 within one or more noise-maker 14 implementations, including: the compressible molded bladder 20, the bag/poly-fill bladder 26, the ribbed/tube 34, and/or other noise-maker devices 14. The noise-making component 46 may include an outer shell 48, a center basin 52, a film flap 54, and/or other components. The outer shell 48 may be rigid and include one or more orifices to house one or more center basins 52. Center basin 52 may be rigid or flexible. Center basin 52 may be more flexible than outer shell 48. Film flap 54 may be permanently or temporarily attached or joined to the center basin 52. Film flap 54 may be flexible and may function as a reed against the center basin 52 as air is forced through center basin 52. When film flap 54 is joined to center basin 52, forced air may cause the film flap 54 to vibrate and emit sound. The center basin 52 and outer shell 48 may enclose film flap 54 in such a way as to maximize the audible sound generated. Vibrational energy from film flap 54 may be transferred to center basin 52 and/or outer shell 48 to increase the volume and/or other qualities of the audible sound generated.

Noise-making component 46 may be constructed out of edible materials such that one or more of outer shell 48, center basin 52, film flap 54, and/or other components of noise-making component 46 are digestible. Noise-making component 46 may be configured to be inserted into one or more orifice(s) 18 of noise-maker 14. This may enable an orifice 18 without an inherent noise-emitting quality to generate sound. Compressed air may be forced through noise-making component 46 and/or other noise-emitting device(s) 16 contained within orifice 18 to generate sound. Orifice 18 may be configured to be a noise-emitting orifice 18 and may be used separately or in conjunction with noise-emitting device 16, noise-making component 46, and/or other sound generating configurations of noise-maker 14 in order to enhance sound qualities of the emitted sound.

Noise-making component 46 may be contained within physical toy body 12. Body 12 may form an internal cavity which can be compressed to force compressed air through noise-making component 46 and/or other noise-emitting device(s) 16. A noise-emitting device 16 and/or a noise-emitting orifice 18 may be contained within physical toy body 12. In this configuration, body 12 may be analogous to bag 26 or bladder 20 of noise-maker 14. In some configurations, multiple noise-emitting devices 14, noise-making components) 46, noise-emitting orifices 18, and/or other noise-emitters may be used in combination to produce a variety of different sounds.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A physical toy, the toy comprising:
    a body having a shape conducive to physical manipulation and play, the body being compliant to facilitate compression during play; and
    a noise-maker carried by the body, the noise-maker consisting of a bladder and a noise-emitting orifice device, the noise-maker being configured to have air forced through the noise-emitting orifice device when the bladder is compressed to cause a noise to be generated by the noise-emitting orifice device, wherein the noise-maker is contained within an internal cavity formed by the body, wherein the noise-emitting orifice device comprises a first portion disposed within the bladder and a second portion protruding outside of the bladder, and wherein one or both of the bladder or the noise-emitting orifice device are formed from digestible material.

2. The physical toy of claim 1, wherein the noise-maker includes multiple noise-emitting orifice devices.

3. The physical toy of claim 1, wherein the body of the toy is stuffed.

4. The physical toy of claim 1, wherein the body of the toy is formed from an open-cell foam.

5. The physical toy of claim 1, wherein the noise-emitting orifice device is created within an internal cavity formed by the body.

6. The physical toy of claim 1, wherein the noise-maker is digestible with amylase and other natural enzymes in the mouth or esophagus, such that digestion will begin in the mouth or esophagus.

7. The physical toy of claim 1, wherein the toy body is digestible.

8. The physical toy of claim 1, wherein the toy body is not digestible.

9. The physical toy of claim 1, wherein the noise-emitting orifice emits sounds when air is compressed through the noise-emitting orifice by a gravitational force acting on a weight enclosed within the noise-maker.

10. The physical toy of claim 1, wherein the bladder is formed by a digestible material.

11. A physical toy, the toy comprising:
 a body having a shape conducive to physical manipulation and play, the body being compliant to facilitate compression during play; and
 a noise-maker carried by the body, the noise-maker consisting of a bladder and a noise-emitting orifice device, the noise-maker being configured to have air forced through the noise-emitting orifice device when the bladder is compressed to cause a noise to be generated by the noise-emitting orifice device, wherein the noise-emitting orifice device comprises a first portion disposed within the bladder and a second portion protruding outside of the bladder, wherein the noise-maker is contained within an internal cavity formed by the body, wherein the noise-emitting orifice device is formed by a digestible material, and wherein one or more structural components of the noise-emitting orifice device are configured to be broken down more quickly by esophageal enzymes relative to one or more other structural components of the noise-emitting orifice to rapidly clear throat obstruction caused by swallowing the noise-emitting orifice device.

12. The physical toy of claim 11, wherein the noise-maker includes multiple noise-emitting orifice devices.

13. The physical toy of claim 11, wherein the body of the toy is stuffed.

14. The physical toy of claim 11, wherein the body of the toy is formed from an open-cell foam.

15. The physical toy of claim 11, wherein the noise-emitting orifice device is fully digestible with amylase and other natural enzymes in the mouth or esophagus, such that full digestion will begin in the mouth or esophagus.

16. The physical toy of claim 11, wherein the toy body is digestible.

17. The physical toy of claim 11, wherein the toy body is not digestible.

18. The physical toy of claim 11, wherein the noise-emitting device emits sounds when air is compressed through the noise-emitting device by a gravitational force acting on a weight enclosed within the noise-maker.

19. The physical toy of claim 11, wherein the bladder is formed by a digestible material.

20. A physical toy, the toy comprising:
 a body having a shape conducive to physical manipulation and play, the body being compliant to facilitate compression during play; and
 a noise-maker carried by the body, the noise-maker consisting of a bladder and a noise-emitting orifice device, the noise-maker being configured to have air forced through the noise-emitting orifice device when the bladder is compressed to cause a noise to be generated by the noise-emitting orifice device, wherein the noise-maker is contained within an internal cavity formed by the body, and wherein one or both of the bladder or the noise-emitting orifice device are formed by a digestible material.

\* \* \* \* \*